(12) United States Patent
Cheon et al.

(10) Patent No.: US 6,421,892 B1
(45) Date of Patent: Jul. 23, 2002

(54) ASSEMBLING MACHINE FOR POSITIVE ELECTRODE PLATE FOR NI-MH BATTERIES

(75) Inventors: San Cheon, Yonin; Ho-Yeon Kim, Pyungtaek; Hi-Un Won, Asan, all of (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/470,591

(22) Filed: Dec. 22, 1999

(30) Foreign Application Priority Data

Jul. 1, 1999 (KR) .............................. 99-26355

(51) Int. Cl.⁷ .......................... B23P 13/00; B23P 19/00
(52) U.S. Cl. ................ 29/2; 29/730; 29/623.1
(58) Field of Search ....................... 29/763, 730, 623.1, 29/2

(56) References Cited

U.S. PATENT DOCUMENTS 2,509,467 A * 5/1950 Anderson, Jr.
3,544,754 A * 12/1970 Buttke et al.
6,327,774 B1 * 12/2001 Cheon et al. ................. 29/730

* cited by examiner

Primary Examiner—John S. Maples
(74) Attorney, Agent, or Firm—Christie, Parker & Hale, LLP

(57) ABSTRACT

An automated assembling machine for a positive electrode plate Ni-MH battery is provided. The machine has an electrode plate feeding unit having a magazine that loads and stacks a cut positive electrode plate, an active material removing unit having an ultrasonic cleaner that removes an active material from an active material removal area of the positive electrode plate, a tab feeding unit transferring a tab strip from a tab strip roll, a tack welding unit that temporarily welds an edge of a tab strip that is transferred from the tab feeding unit to upper and lower faces of the active material removal area of the positive electrode plate, a cutting unit that cuts a rectangular tab of a predetermined size from the temporarily welded tab strip, a finish welding unit that fully welds the temporarily welded tab, a calendar rolling unit that presses the finish welded positive electrode plate to a predetermined thickness, and a blanking press unit that cuts the calendar rolled positive electrode plate into a desired shape.

11 Claims, 24 Drawing Sheets

ASSEMBLING MACHINE FOR POSITIVE ELECTRODE PLATE FOR NI-MH BATTERIES

BACKGROUND OF THE INVENTION (a) Field of the Invention

The present invention relates to an assembling machine for Ni-MH batteries and an assembly process thereof, more particularly, to an automated assembling machine for a positive electrode plate Ni-MH battery which is a secondary battery and the assembly process using the assembling machine thereof.

(b) Description of the Related Art

With the rapid increase in the spread of portable devices such as personal communication systems and notebook computers, there has been a demand for the development of secondary batteries that are compact, lightweight, and have high energy density. The introduction of environmentally friendly zero-emission electric vehicles has also resulted in the further demand for the development of secondary batteries as power sources.

Batteries generally convert chemical energy into electrical energy by the electric potential difference between metals, and can be classified as primary (nonrechargeable) batteries, secondary (rechargeable) batteries, and special batteries such as solar cells. Primary batteries can be further classified as manganic cell, alkaline cell, mercuric oxide cell, and silver oxide cell batteries depending on the type of electrode, while secondary batteries can be classified as Ni-MH batteries using metal-hydroxide as the electrode, sealed nickel-cadmium batteries, lithium-metal batteries, lithium-ion batteries, and lithium-polymer batteries.

While primary batteries have disadvantages such as short life, low capacity, and nonrechargeability, secondary batteries have excellent performance characteristics for electric vehicles due to their high capacity and long life. Ni type batteries are widely used as secondary batteries because they have proven to have good recycling characteristics and environmental performance.

However, the above Ni type batteries, especially Ni-MH batteries have the disadvantage of low production efficiency that results from a large number of operational steps and a long lead time due to manual assembly operations.

FIG. 1 shows the production process for the positive electrode plate for Ni-MH batteries with previously employed manual assembly operations consisting of ten operational steps.

As indicated in FIG. 1, a line operator cuts a positive electrode plate 201 of a predetermined length from a Ni foam coating roll using a cut-off machine, and marks an edge of a tab 205 area with a press to facilitate the attachment of a tab 203 of a predetermined length. After cutting tabs 205 from a Ni foil roll, two of these tabs 203 are. folded and temporarily welded at their. corner. The Ni foam coated positive electrode plate 201 is inserted in the fold of the tabs, and they are then temporarily welded together. At this point, the welding of the tab to the positive electrode plate 201 is completed using a welding machine with a wider tip. The welded positive electrode plate 201 is then coated with nickel hydroxide paste by manual operations, and after the paste has dried, the positive electrode plate is cut using a cut-off machine. The positive electrode plate is then blanked using a press, and any residual nickel hydroxide from the coating process that may exist between the tabs can be cleaned using alcohol, and the final product is complete.

However, as the above assembly process for a positive electrode plate for Ni-MH batteries by previously employed manual assembly operations is dependent on manual operations using manual tools, the total manufacturing expense and product reject rate is high due to a large number of assembly operational steps.

SUMMARY OF THE INVENTION

The present invention made to solve the above problems provides the assembling machine for a positive electrode plate and an assembly process thereof, wherein the positive electrode plate for Ni-MH batteries can be made through an automated on-line production process so that cost, time, and reject rate of production can be substantially reduced, and hence production efficiency can be maximized.

The above described assembling machine for the positive electrode plate consists of an electrode plate feeding unit having a magazine that loads and stacks the cut positive electrode plate manually, an active material removing unit having an ultrasonic cleaner that removes an active material from an active material removal area of the positive electrode plate, a tab feeding unit transferring a tab strip from a tab strip roll, a tack welding unit that temporarily welds an edge of a tab strip that is transferred from the tab feeding unit to upper and lower faces of the active material removal area of the positive electrode plate, a cutting unit that cuts rectangular tabs of a predetermined size from the temporarily welded tab strip, a finish welding unit that fully welds the temporarily welded tab, a calendar rolling unit that presses the finish welded positive electrode plate to a predetermined thickness, and a blanking press unit that cuts the calendar rolled positive electrode plate into a desired shape.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

In the following detailed description, only the preferred embodiment of the invention has been shown and described, simply by way of illustration of the best mode contemplated by the inventor for carrying out the invention. As will be realized, the invention is capable of modification in various respects, all without departing from the invention. Accordingly, the drawings and description are to be regarded as illustrative in nature, and not restrictive.

Figure 1:
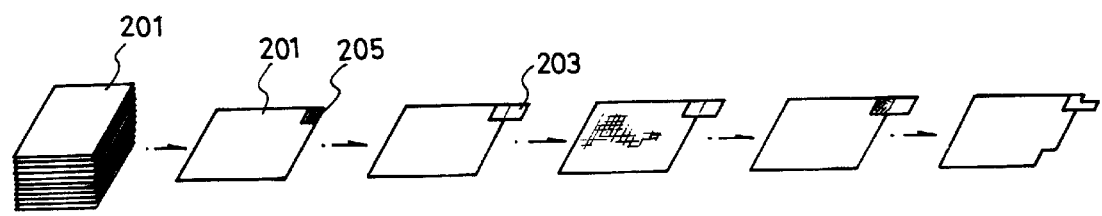
FIG. 1 is an outline diagram illustrating the assembly process for a positive electrode plate for Ni-MH batteries by previously employed manual assembly operations.
Figure 2:
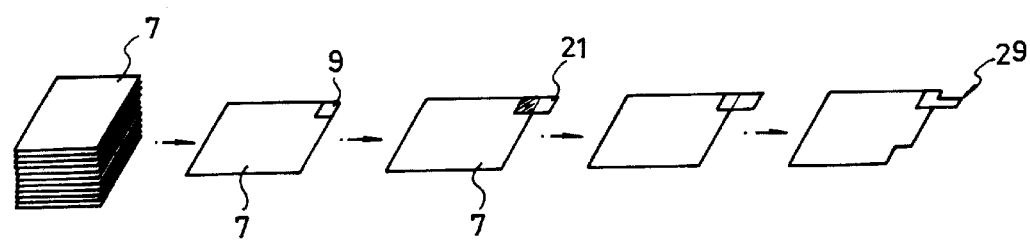
FIG. 2 is an outline diagram illustrating the assembly process for a positive electrode plate for Ni-MH batteries by an assembling machine according to the present invention.

An assembling machine for a positive electrode plate for Ni-MH batteries according to the present invention can assemble and produce a positive electrode plate by a series of processes as shown in FIG. 2 in a manner that is similar to previously employed manual assembly operations. A line operator cuts a positive electrode plate to a predetermined length from a belt that has been transferred from an automatic paste coating machine. A line operator performs a direct preparation step of loading the cut positive electrode plate into the assembling machine. These operations consisted of feeding the positive electrode plates one by one, striking an active material removal area 9, removing coated active material from the active material removal area 9, welding a tab 21 on upper and lower face thereof, and finally blanking it into a desired shape.

Figure 3:
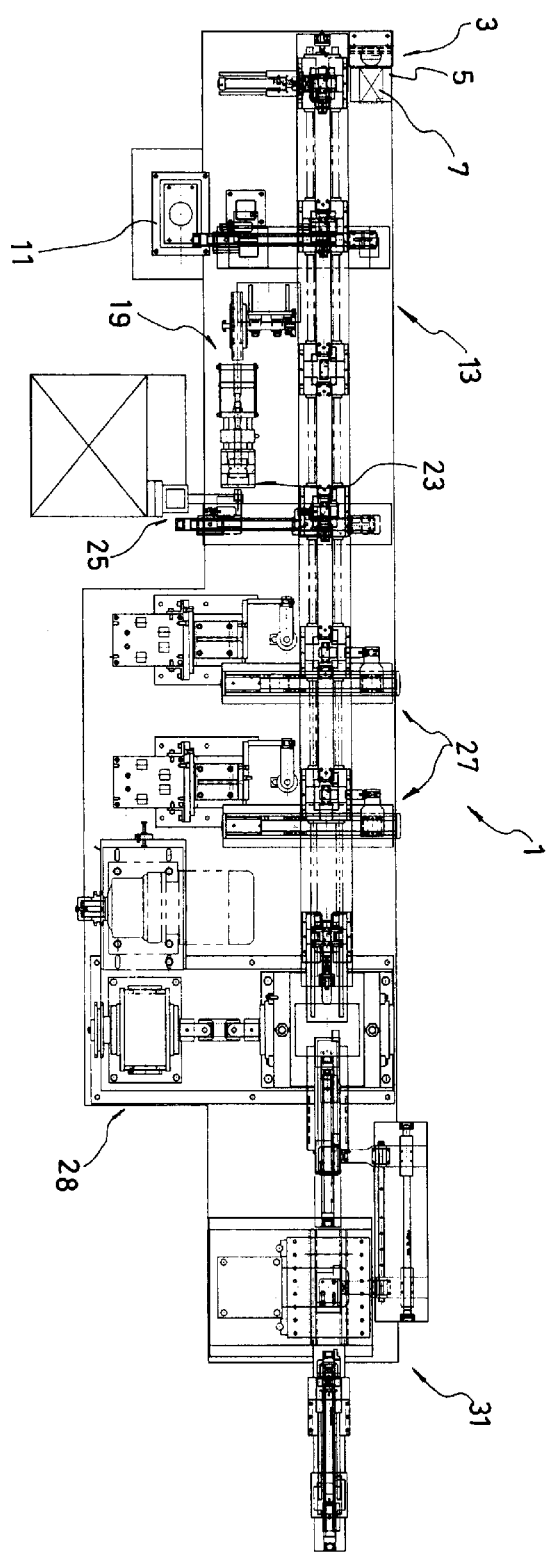
FIG. 3 is an overall plane view of an assembling machine according to the present invention.

A positive electrode plate assembling machine 1 as shown in FIG. 3 consists of many processing units, such as an electrode plate feeding unit 3, an active material removing unit 13, a tab feeding unit 19, a tact welding unit 25, a cutting unit 23, a finish welding unit 27, a calender rolling unit 28, and a blanking press unit 31.

Figure 4A:
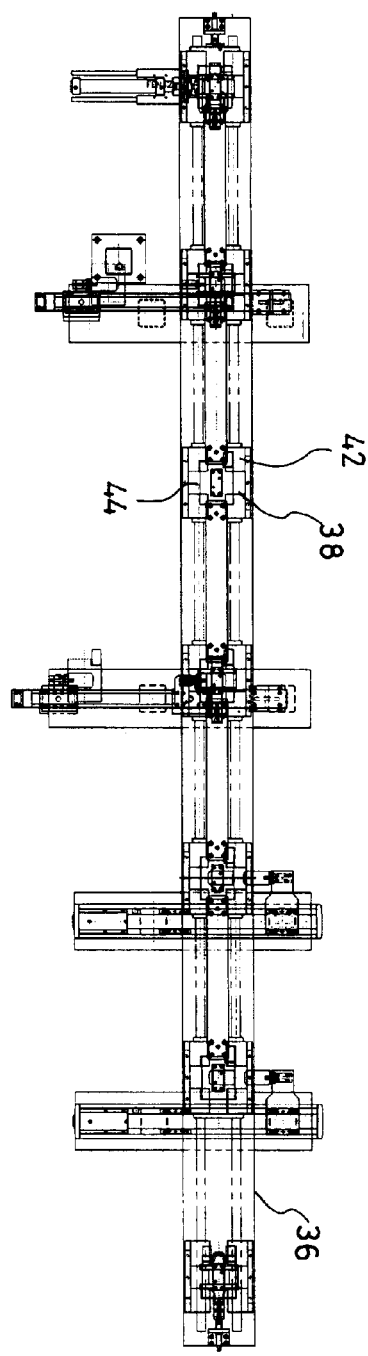
FIGS. 4A to 4C respectively provide a plane view, a front view, and a side view illustrating an under-shuttle of an assembling machine as shown in FIG. 3.
Figure 4B:
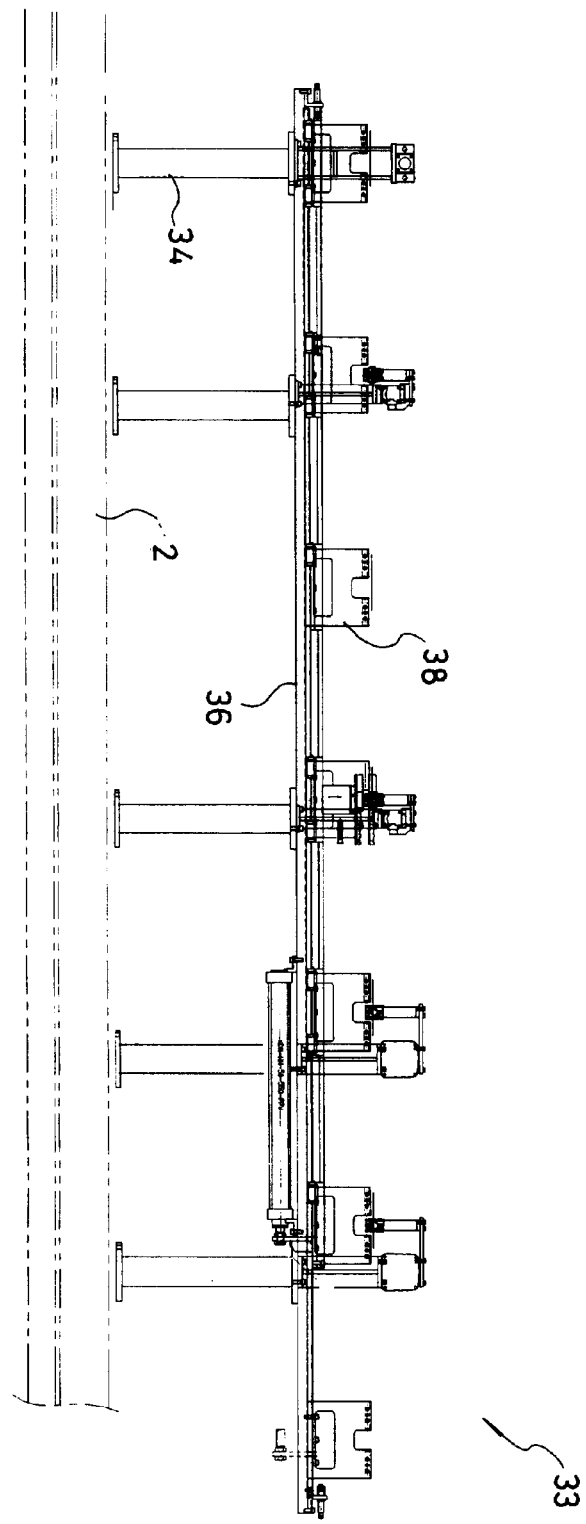
Figure 4C:
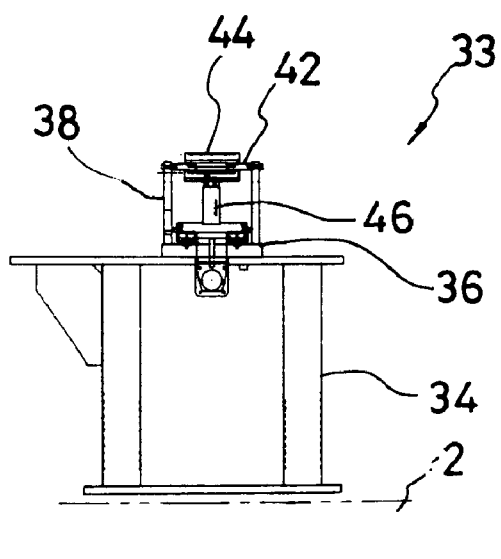

An under-shuttle 33 as shown in FIGS. 4A to 4C is disposed at the bottom face of an assembling machine 1 for transporting a series of positive electrode plate through the above composing units 3, 13, 25, 27, and 28. The under-shuttle 33 transfers the positive electrode plate 7 between each unit 3, 13, 25, 27, and 28, and the under-shuttle 33 is supported by a vertical frame 34 disposed at a base frame 2. The under-shuttle 33 consists of a base plate 36 comprising a base, a slide plate 38 moving between each unit, a fixed seat 42 attached above the slide plate for locating the positive electrode plate 7, a moving seat 44 that moves toward two opposite ends of the slide plate 38 through an opening at a center portion of the fixed seat 42, and a guide cylinder 46 causing a reciprocation of the moving seat 44.

Figure 5A:
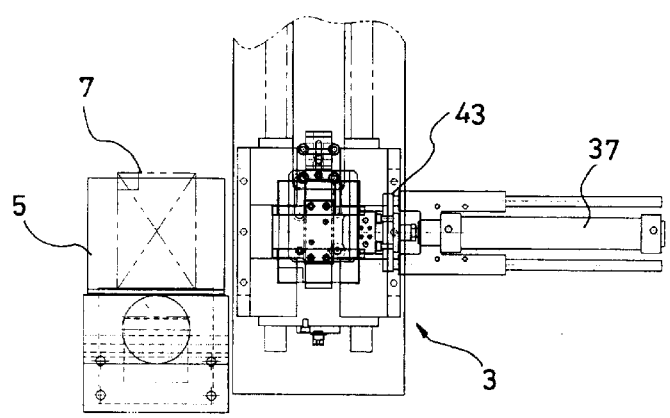
FIGS. 5A to 5C respectively provide a plane view, a side view, and a front view illustrating a positive electrode feeding unit of an assembling machine as shown in FIG. 3.
Figure 5B:
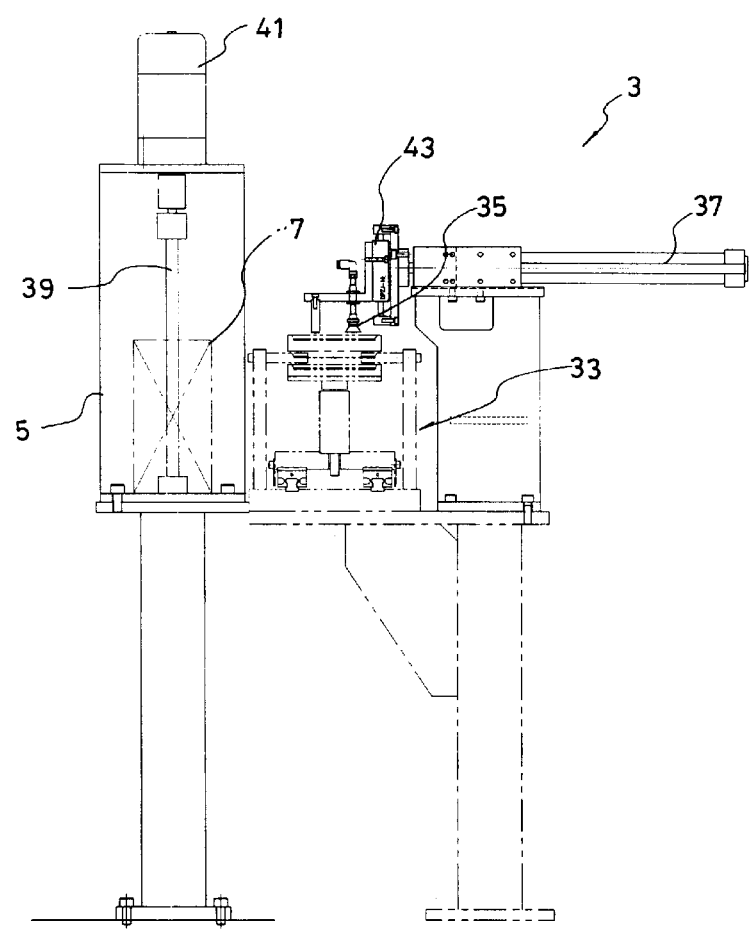
Figure 5C:
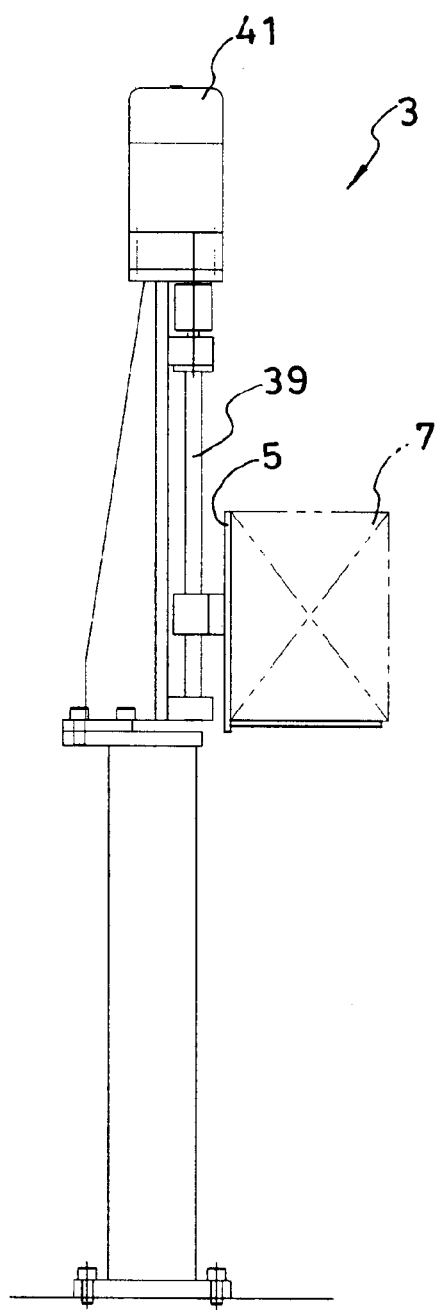

The above electrode plate feeding unit 3 consists of a positive electrode plate loading magazine 5, a suction pad 35 for transferring the positive electrode plate 7 loaded in the magazine 5, and a cylinder 37 reciprocating the suction pad 35 as shown in FIGS. 5A to 5C so that the cut positive electrode plate 7 that is loaded into the magazine 5 can be transferred to the active material removing unit 13. The magazine 5 as shown in FIG. 5C is reciprocated along a guide road 39 by a driving force of the cylinder 41, and the positive electrode plate 7 can be held by the suction pad 35.

The above suction pad 35 is disposed above the under-shuttle 33 by a pad bracket 43 and transfers the positive electrode plates 7 that are stacked in the magazine 5 by the horizontal movement of a moving cylinder 27 from the magazine 5 to the under-shuttle 33. The moving cylinder 37 is disposed above the under-shuttle 33 in order to transfer the suction pad 35 from side to side.

Figure 6A:
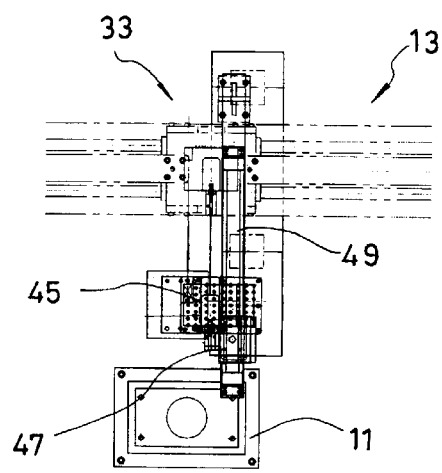
FIGS. 6A to 6C respectively provide a plane view, a front view, and a side view illustrating an active material removing unit of an assembling machine as shown in FIG. 3.
Figure 6B:
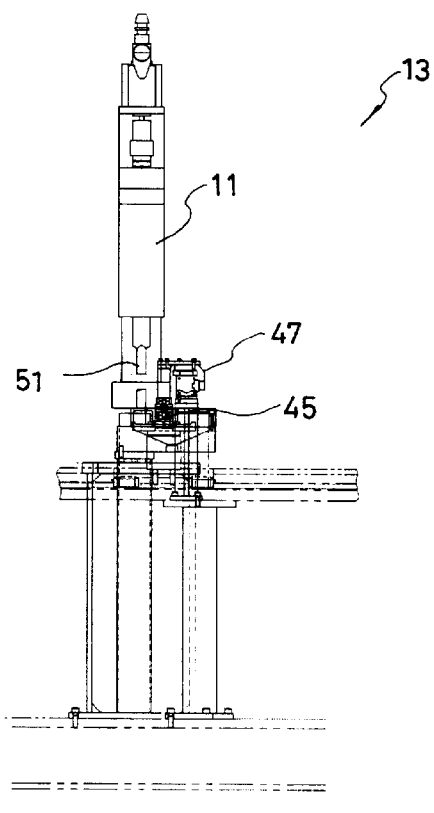
Figure 6C:
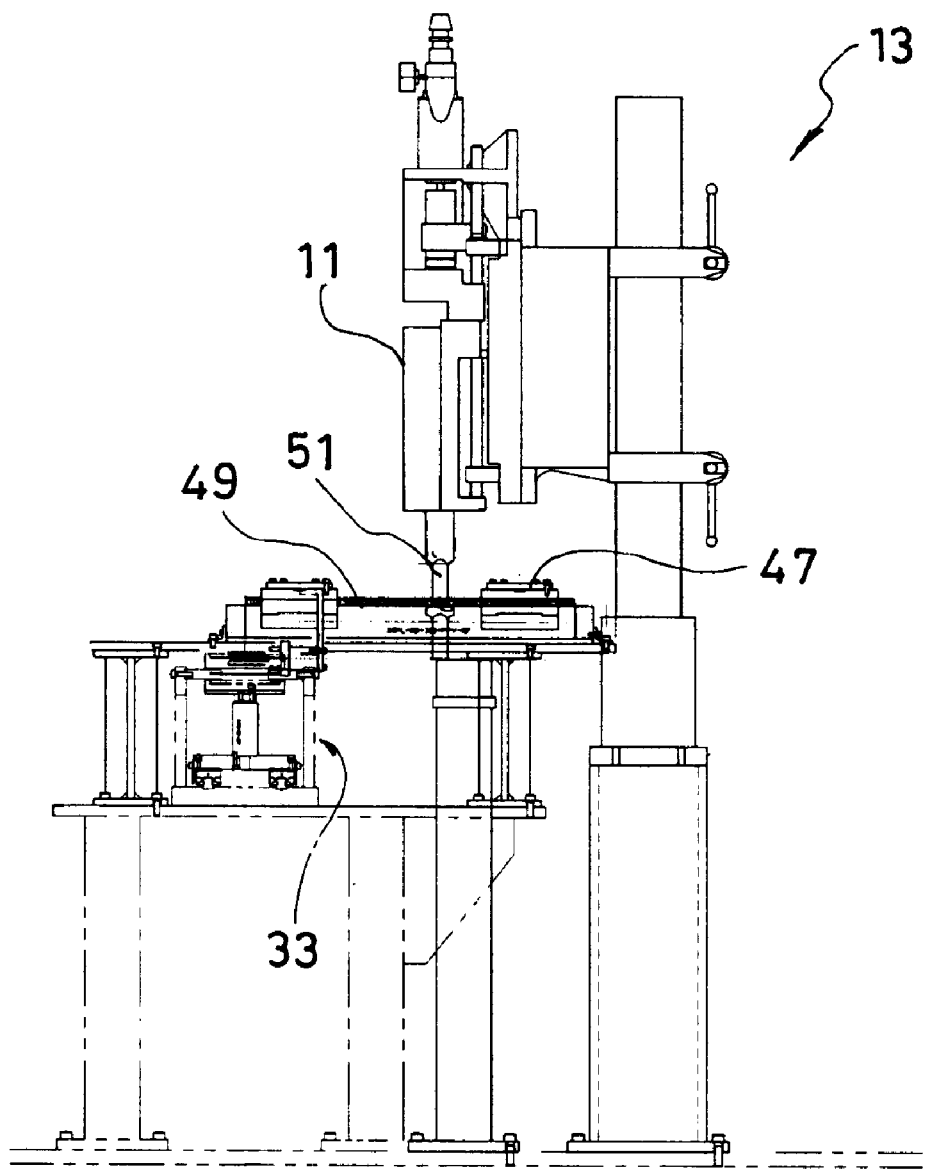

The active material removing unit 13 for removing the active material from one edge 9 of the positive electrode plate 7 as shown in FIGS. 6A to 6C consists of a finger portion 45 for holding the positive electrode plate 7, a cylinder 49 for moving the finger portion 45, and a cleaner for removing the active material. The finger portion 45 that is attached to the cylinder 49 for moving the finger portion 45, moves in an axial direction of the cylinder 49. The active material removing unit 13 holds and transfers the positive electrode plate 7 from the under-shuttle 5 to the active material removing position. The cylinder 49 transfers the finger portion 45 in a normal direction to the under-shuttle 33 by a hand portion 47 that is attached for sliding in an axial direction thereof. A ultrasonic cleaner 41 removes the active material by an ultrasonic vibration from the active material removal area 9 of the positive electrode plate 7 that is moved to the finger portion 45 by a cleaning horn 51.

Figure 7A:
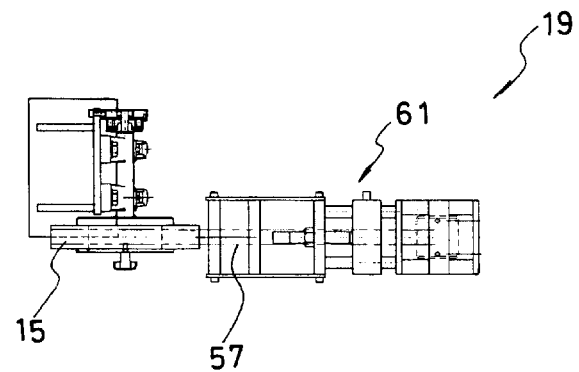
FIGS. 7A and 7B respectively provide a plane view and a front view illustrating a tab feeding unit of an assembling machine as shown in FIG. 3.
Figure 7B:
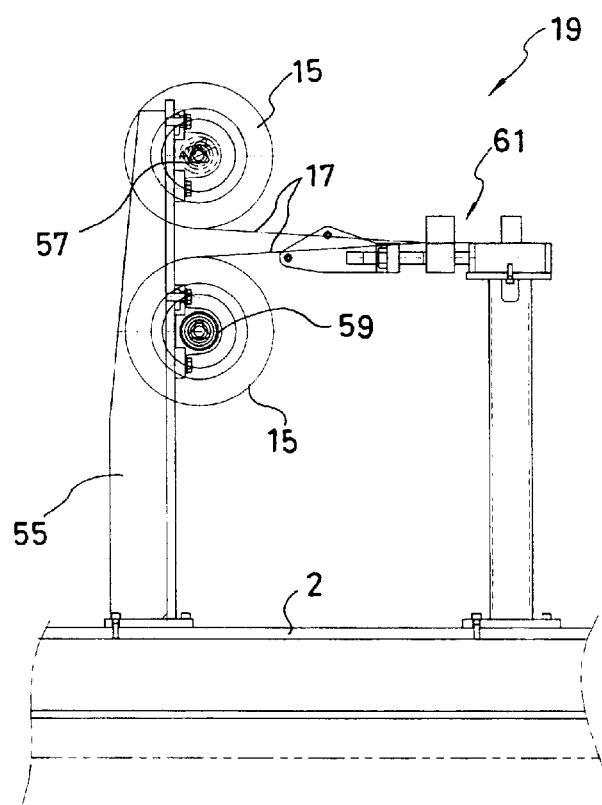

A tab feeding unit 19 which transfers tab strips 17 from tab strip rolls 15 to the tact welding unit 25 as shown in FIGS. 7A and 7B consists of the tab strip rolls 15 and a sliding air feeder 61 unwinding the tab strips 17 from the tab strip rolls 15. The tab strip rolls 15 are disposed for rotation by upper and lower shafts 57 and 59 that are located near two opposite ends of a column 55 on a base frame 2. The sliding air feeder 61 that is attached to a column 54 is made for interconnecting the tab strips 17 from upper and lower tab strip rolls 15 and then moving the tab strips 17 to the tact welding unit 25.

Figure 8A:
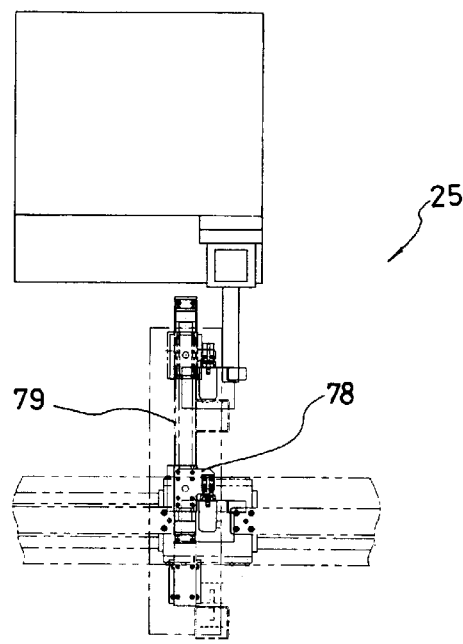
FIGS. 8A to 8C respectively provide a plane view, a front view, and a side view illustrating a tact welding unit of an assembling machine as shown in FIG. 3.
Figure 8B:
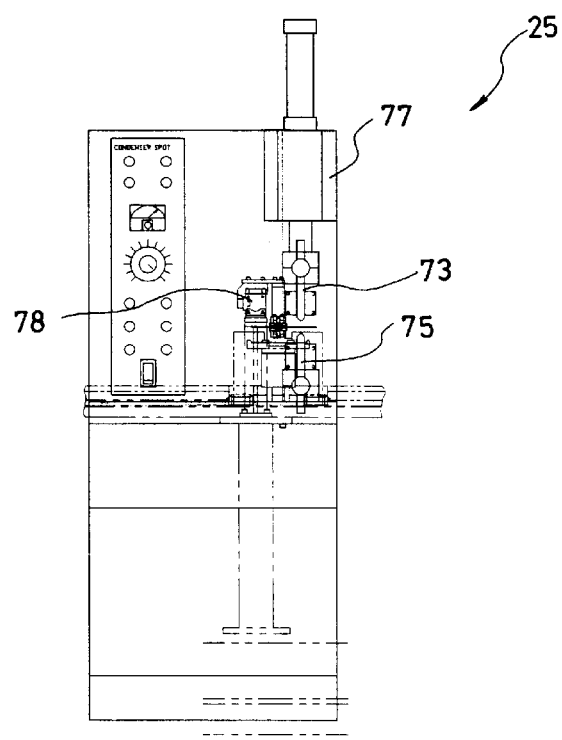
Figure 8C:
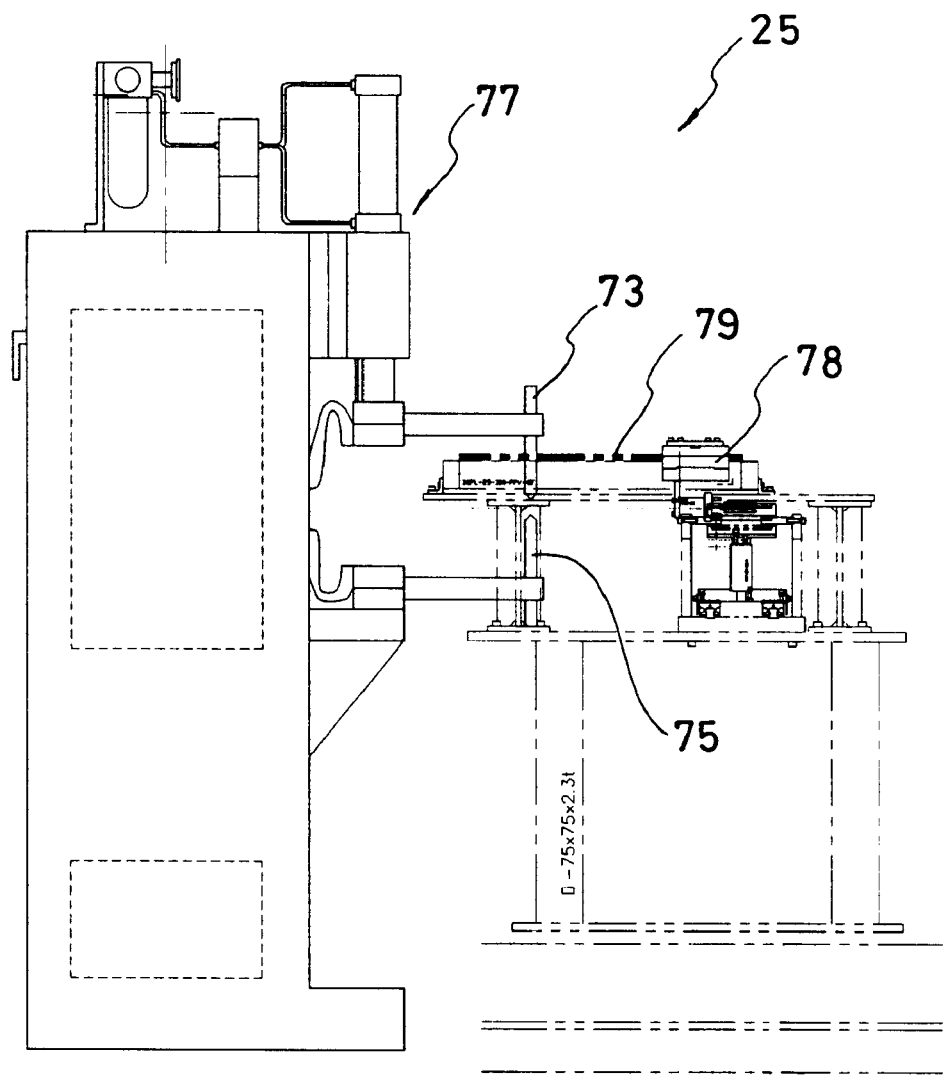
Figure 9A:
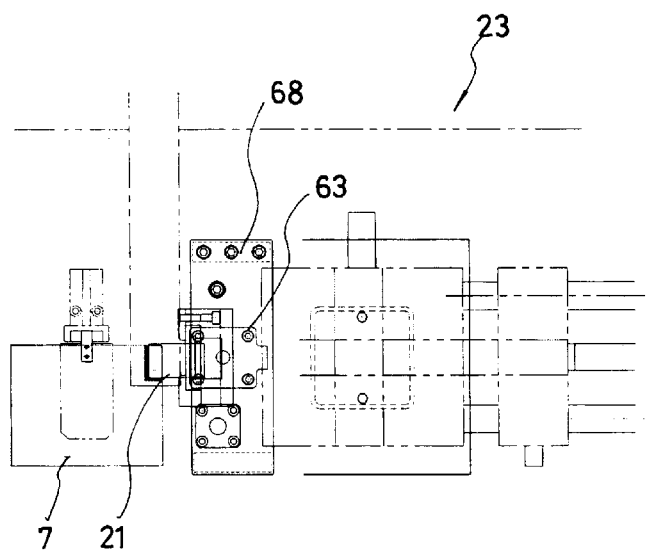
FIGS. 9A to 9D respectively provide a plane view, a front view, a side view, and a partial detailed view illustrating a cutting unit of an assembling machine as shown in FIG. 3.
Figure 9B:
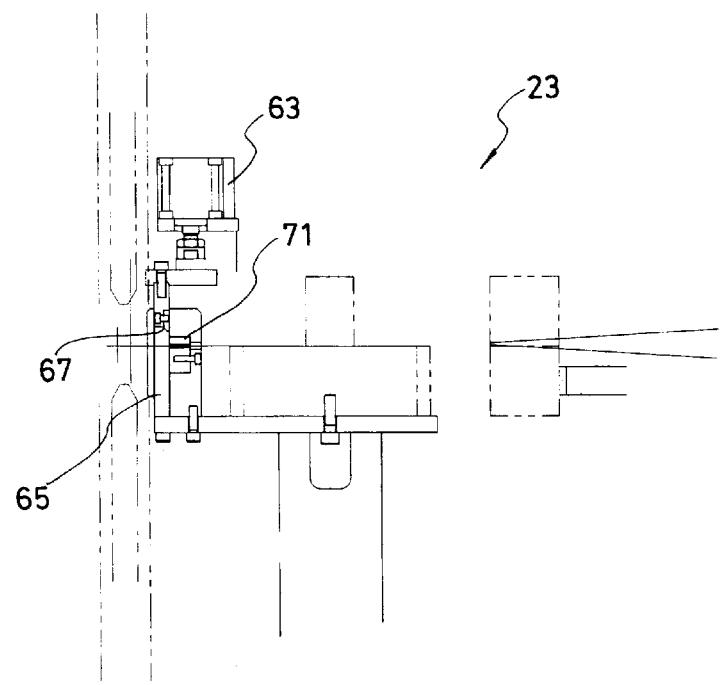
Figure 9C:
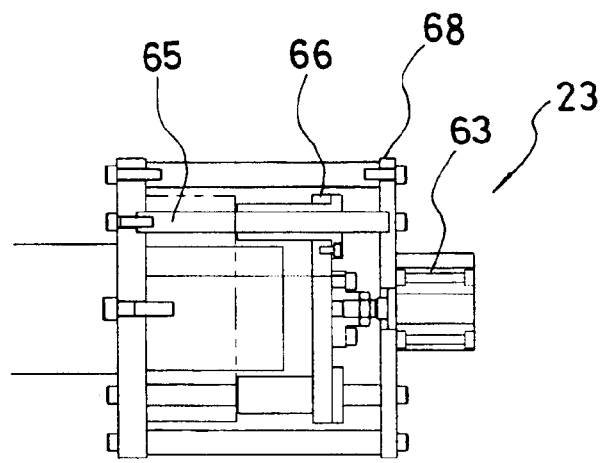
Figure 9D:
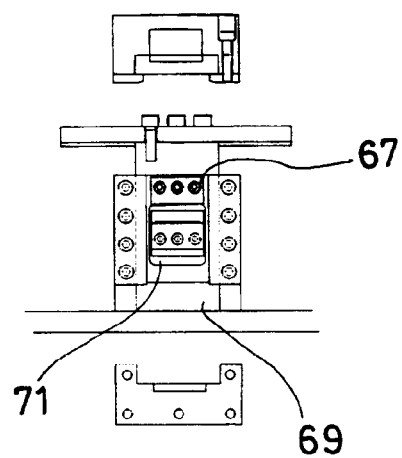

The tack welding unit 25 as shown in FIGS. 8A to 8C is made to temporarily weld the end of the tab strips 17 that are transferred from the tab feeding unit 19 to two opposite ends of the active material removal area 9 of the positive electrode plate 7. The tack welding unit 25 consists of a tack welding machine 77, a finger portion 81 and a sliding cylinder 79. The tack welding machine 77, general condenser welding machine, wherein upper and lower welding tips 73 and 75 are disposed at the tack welding position for temporarily welding the tab strip 17 at a point with the folded upper and lower faces of the active material removal area 9 of the positive electrode plate 7. The finger portion 81 is attached to the sliding cylinder 79 by the hand portion 78 for transferring the positive electrode plate 7, that is moved from the active material removing unit 13 by the under-shuttle 33, to the tack welding area. The sliding cylinder 79 is disposed in a normal direction to the under-shuttle 33 for reciprocating the finger portion 81 in an axial direction.

A cutting unit 23 for cutting the tab strip 17 of a predetermined length that is temporarily welded at the active material removal area 9 of the positive electrode plate 7 as shown in FIGS. 9A to 9D is disposed at the edge of the tab feeding unit 19 and near the welding tips 73 and 75 of the tact welding unit 25 for forming a rectangular tab 21 and cutting the: tab strip 17 at the temporarily welding state. The cutting unit 23 consists upper and lower cutting blades 67 and 71 and a cylinder 63 reciprocating the upper cutting blade 67.

The upper cutting blade 67 cuts the temporarily welded tab strip 17 while the upper cutting blade 67 is attached to a lower plate 66 reciprocating along the guide post 65. The cylinder 63 disposed on an upper plate 68 moves the lower plate 66. A lower cutting blade 71 is fixed at a slide 69 from the bottom of the opposite side of the blade 67.

Figure 10A:
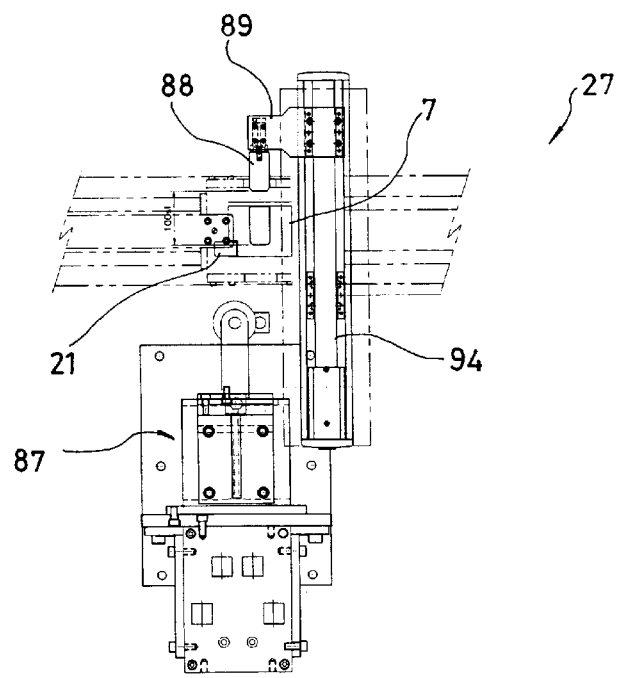
FIGS. 10A to 10C respectively provide a plane view, a front view, and a side view illustrating a finish welding unit of an assembling machine as shown in FIG. 3.
Figure 10B:
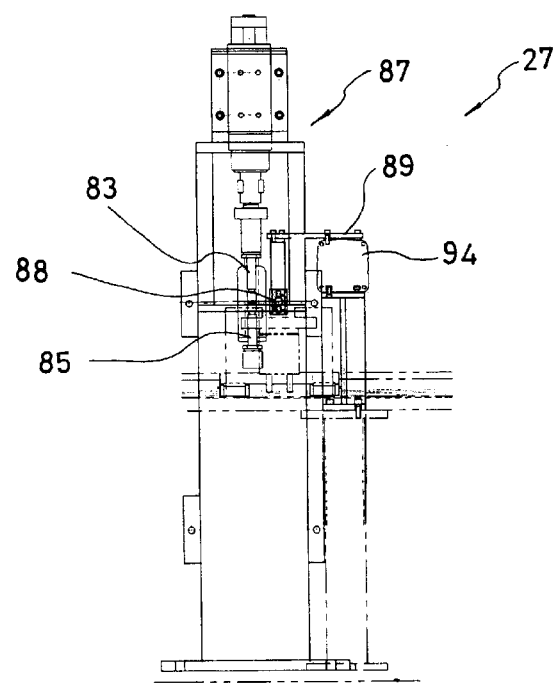
Figure 10C:
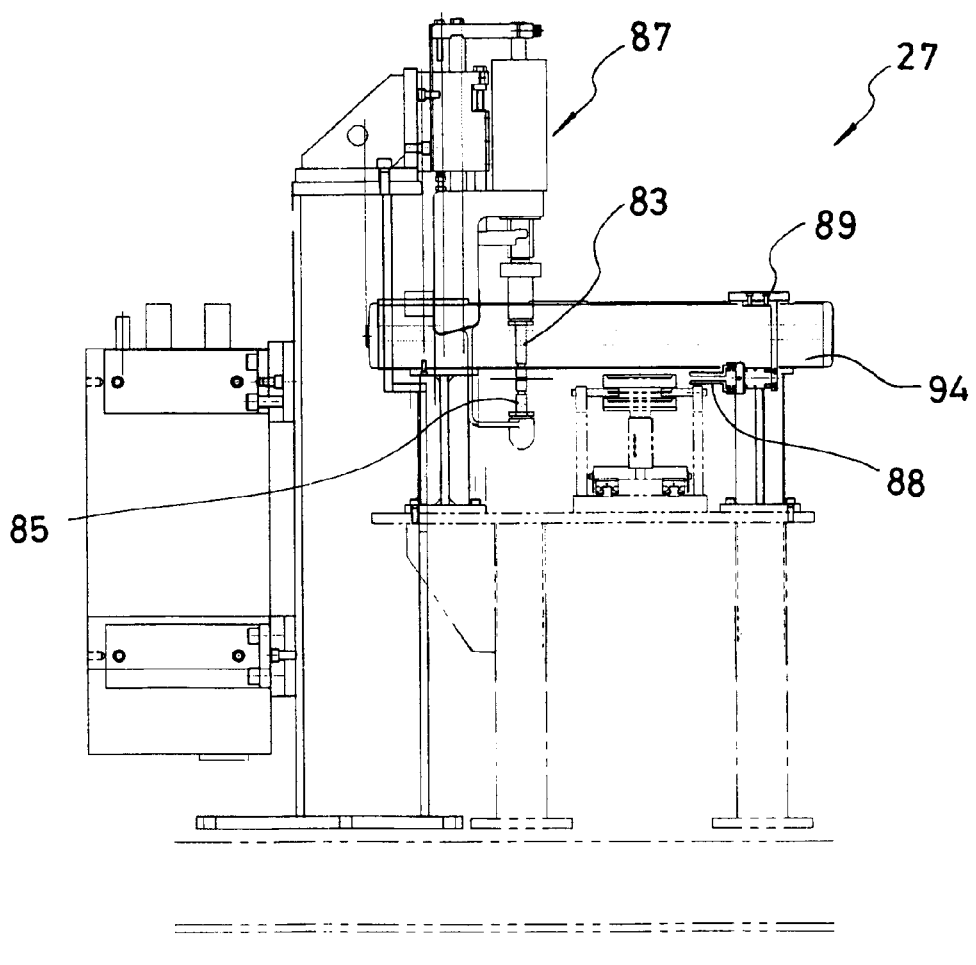

The finish welding unit 27 as shown in FIGS. 10A to 10C consists of a general DC welding machine 87, a finger portion 88, and an orthogonal robot 89 for completely welding a temporarily welded tab 21. The finish welding machine 87 having welding tips 83 and 85 that are disposed at upper and lower positions of the finish welding area, can multi-weld upper and lower faces of the overlapped areas of the tab 21 of the positive electrode plate 7 that is loaded to the finish welding area. The positive electrode plate 7 can be moved precisely by the orthogonal robot 89 for multi-welding and is thus welded three or four times. The finger portion 88 is attached to a body of the orthogonal robot 89 for holding the positive electrode plate 7 that is transferred from the tack welding unit 25 by the under-shuttle 33 and loading the positive electrode plate 7 into the finish welding area. The orthogonal robot 89 is made for being reciprocated along a rail 94 that is disposed in a normal direction to the under-shuttle 33 for reciprocating the finger portion 88 in an axial direction.

Figure 11A:
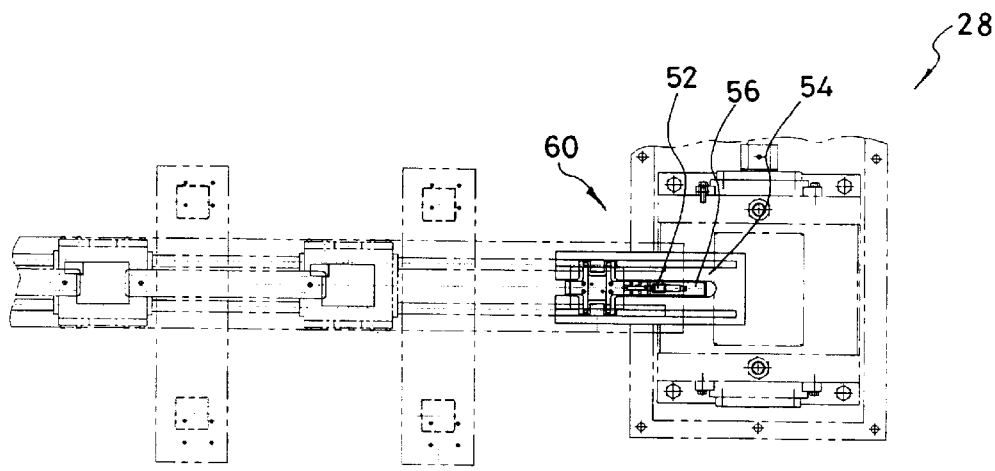
FIGS. 11A to 11C respectively provide a plane view, a front view, and a side view illustrating a moving portion of a calender rolling unit of an assembling machine as shown in FIG. 3.
Figure 11B:
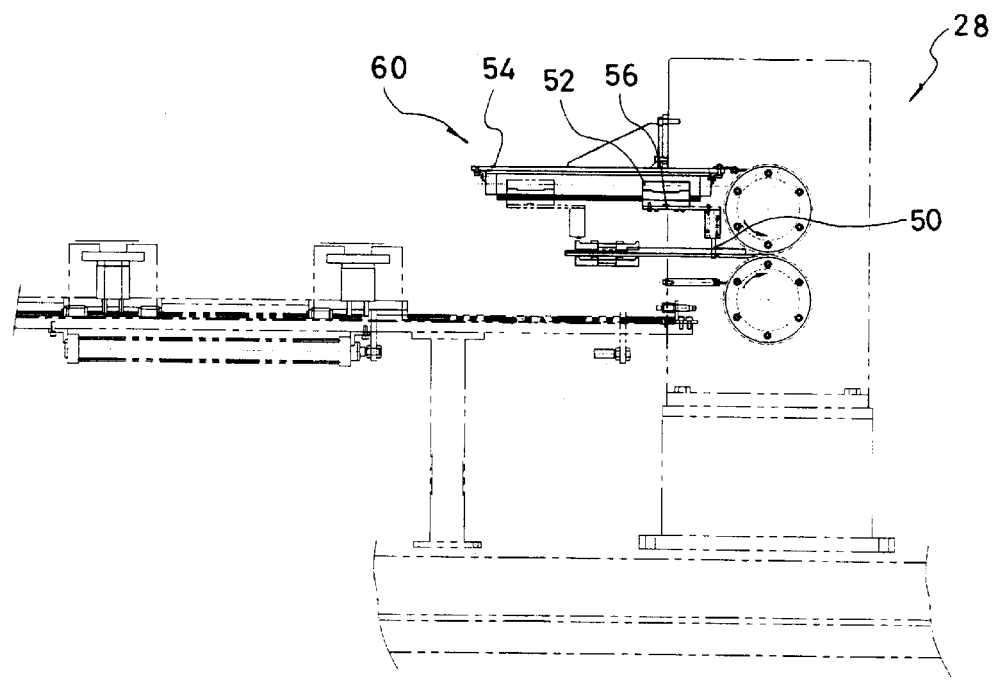
Figure 11C:
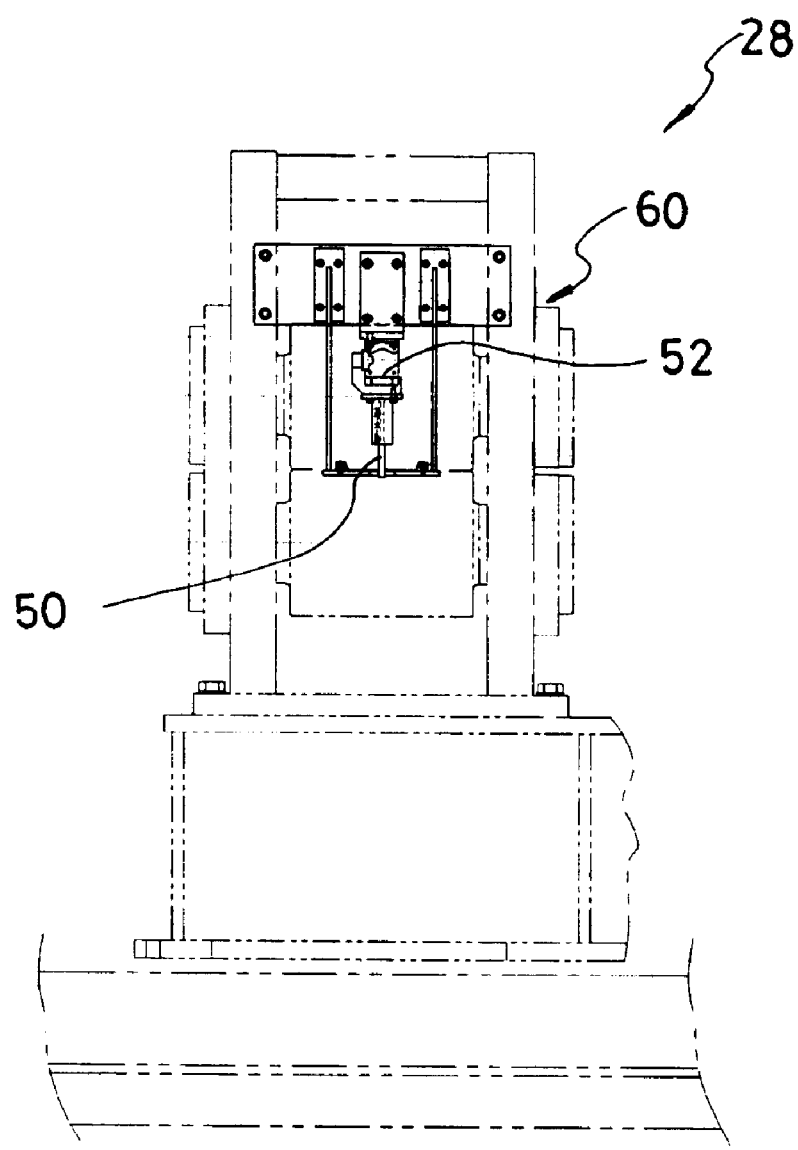
Figure 12A:
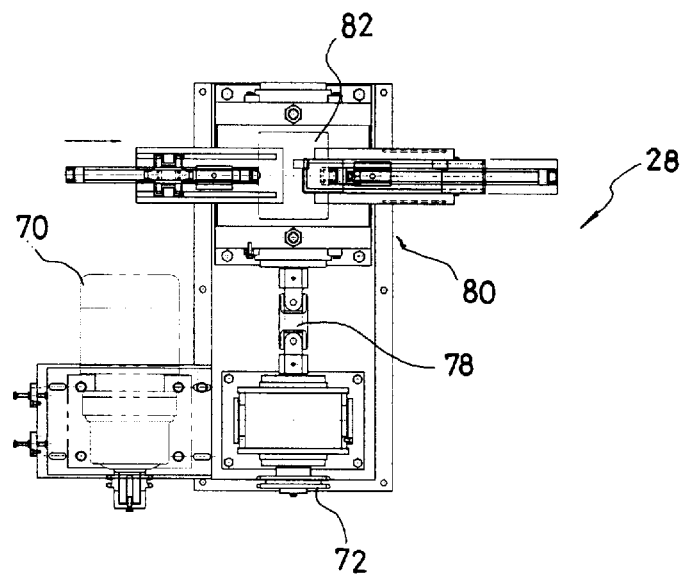
FIGS. 12A to 12C respectively provide a plane view, a side view, and a partial front view illustrating a pressing portion of a calender rolling unit of an assembling machine as shown in FIG. 3.
Figure 12B:
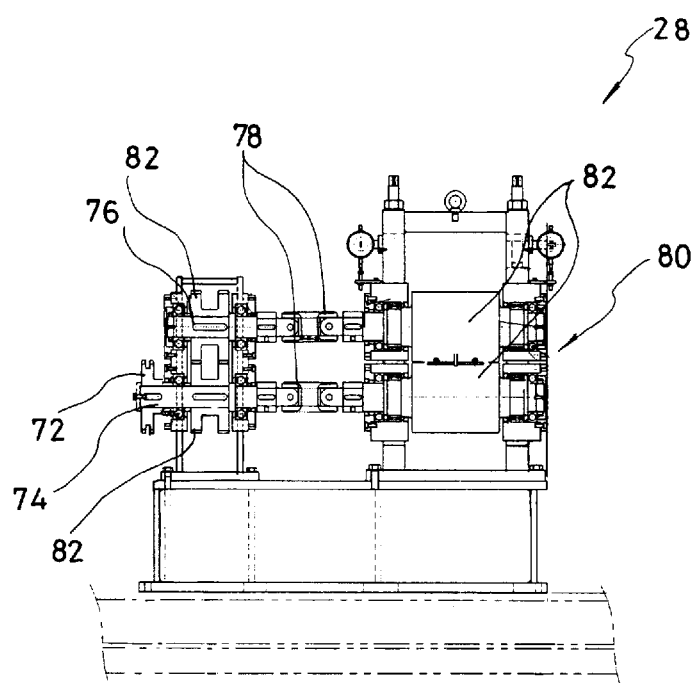
Figure 12C:
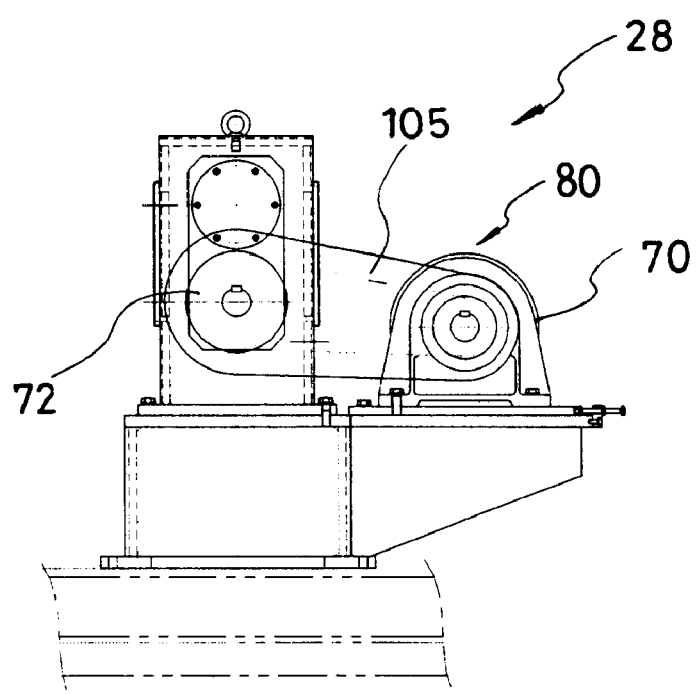

A calender rolling unit 28 consists of a transferring portion 60 as shown in FIGS. 11A to 11C and a sub assembly of a pressing portion 80 as shown in FIGS. 12A to 12C for pressing and spreading of the positive electrode plate 7, to a predetermined length, and the finish. welding is completed.

The transferring portion 60 consists a moving cylinder 52 and a push cylinder 53 that transfers the positive electrode plate 7 from the under-shuttle 33 as shown in FIGS. 11A to 11C. The laterally reciprocating moving cylinder 52 is disposed at the bottom of the bracket 56 parallel to the under-shuttle 33 and in a normal direction to upper and lower press rolls 82. The push cylinder 53 is disposed at the bottom of the moving cylinder 52 by the bracket 56 for the purpose of the lateral reciprocation. A push rod 50 reciprocating from side to side can push the positive electrode plate 7 between upper and lower press rolls 82.

The pressing portion 80 as shown in FIGS. 12A to 12C consists of a driving motor 70 as a power source, .a main spindle 74 and a idling spindle 76 transmitting a rotational driving force to the press roll 82, and upper and lower press rolls 82 calendering the positive electrode plate by the transmitted rotational driving force. The driving motor 70 rotates a sprocket 72 connected to the main spindle 74 by a driving chain 105 for transmitting a rotational force to the main spindle 74 and idling spindle 76.

The main spindle 74 is directly connected to the sprocket 72 for the rotation by the transmitted rotational force of the sprocket 72, and is also made for transferring the rotational force to the idling spindle 76 being parallel to the above by a pair of driven gears 82 that are connected to the side of the main spindle 74. Upper and lower press rolls 82 connected to the main spindle 74 and idling spindle 76 by a pair of universal joints 78 are positioned between a bracket 54 of the moving portion 60 and a bracket of a blanking press unit 31 so that upper and lower press rolls 82 can calender the positive electrode plate 7 that is transferred from the under-shuttle 33 by the rotational force transmitted from the driving motor 70 through the main spindle 74 and idling spindle 76.

Figure 13A:
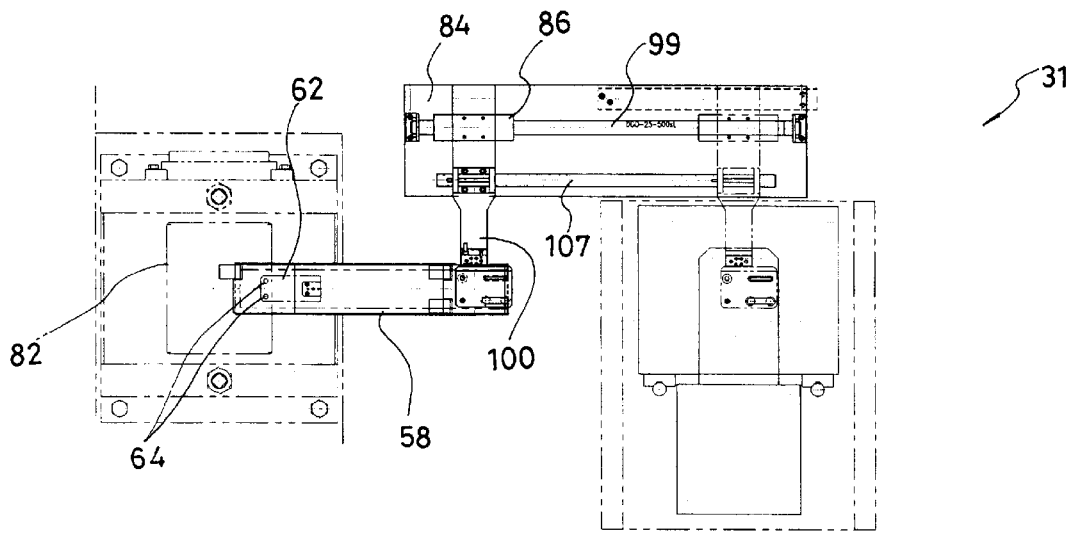
FIGS. 13A to 13C respectively provide a plane view, a front view, and a side view illustrating a moving portion of a blanking press unit of an assembling machine as shown in FIG. 3.
Figure 13B:
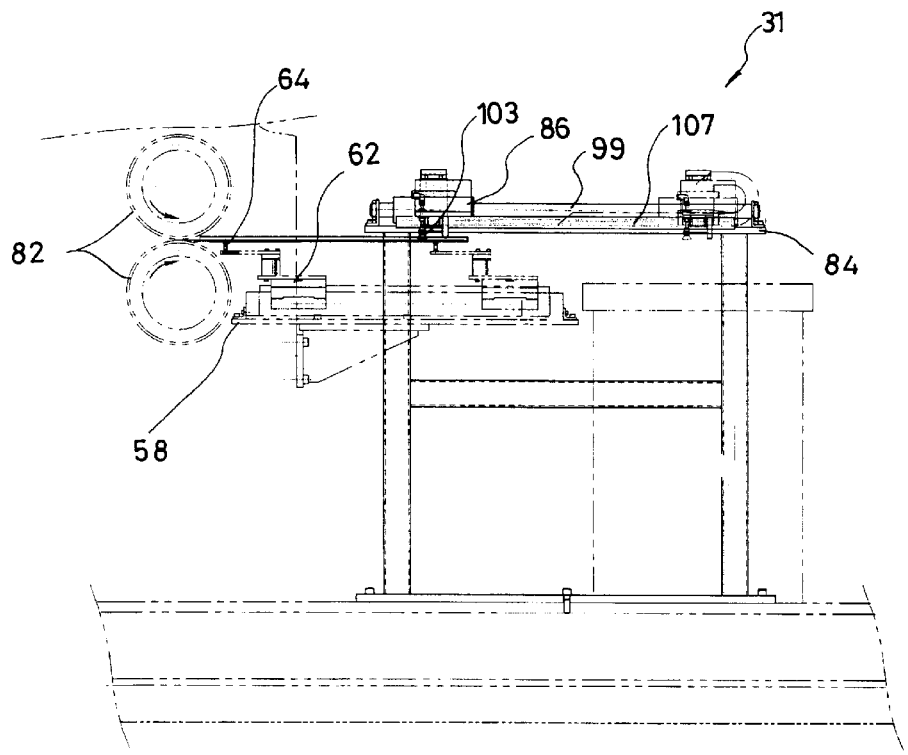
Figure 13C:
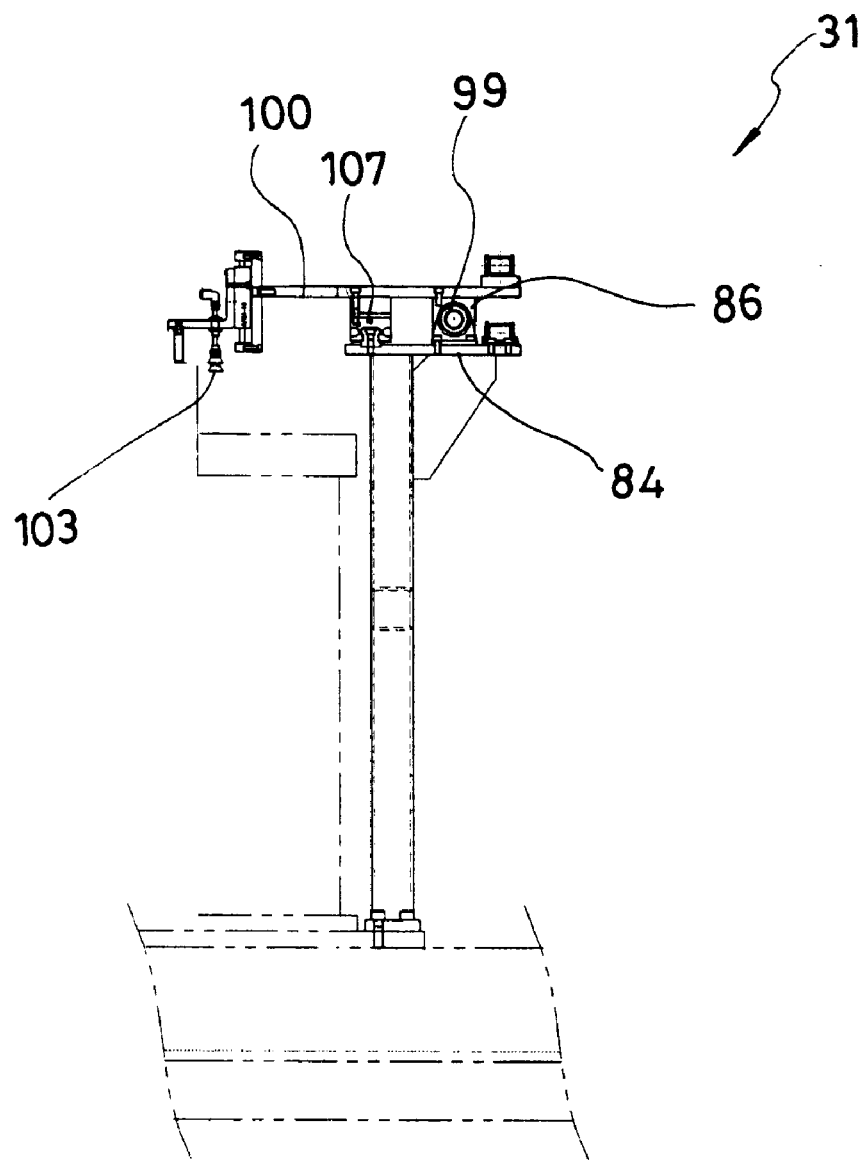
Figure 14A:
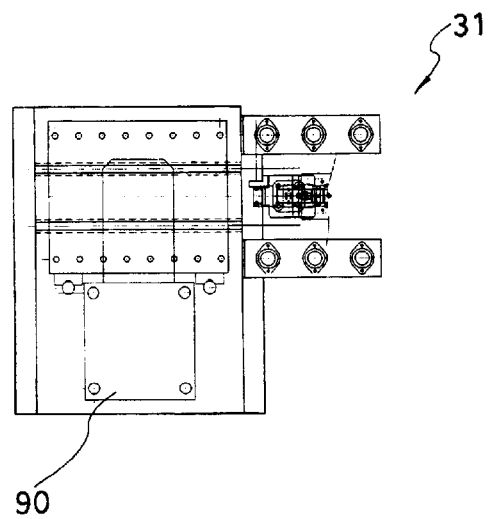
FIGS. 14A to 14C respectively provide a plane. view, a front view, and a side view illustrating a press of a blanking press unit of an assembling machine as shown in FIG. 3.
Figure 14B:
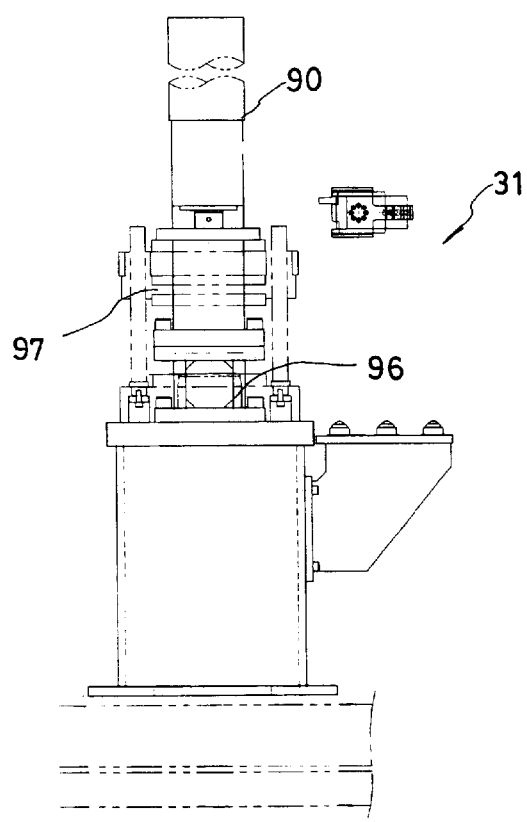
Figure 14C:
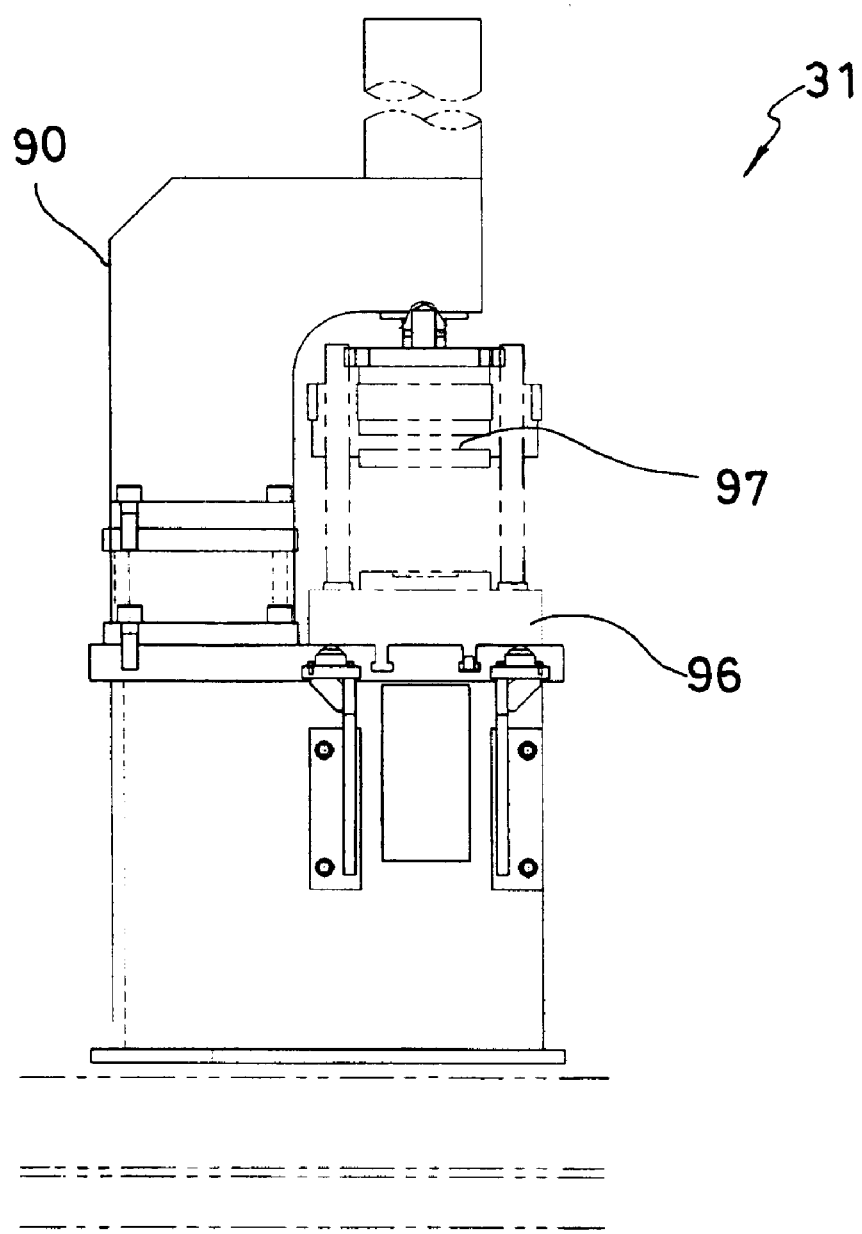

The blanking press unit 31 as shown in FIGS. 13A to 13C consists of a cut-off press 90 as shown in FIGS. 14A to 14C, a moving cylinder 62 with a suction pad 64 transferring the positive electrode plate 7 from the press roll 82, and a moving cylinder 86 with a suction pad 103 transferring the positive electrode plate 7 to the cut-off press 90.

The cut-off press 90 as shown in FIGS. 14A to 14C consists of a main body of the press 90 for developing the blanking force, a mold base 96 forming a bottom of the press and having an opening, and a blanking punch 97 having a predetermined configuration and disposed on the mold base 96. The moving cylinder 62 as shown in FIGS. 13A to 13C that is disposed at the top of the bracket 58 being parallel to the under-shuttle 33 and in a normal direction to the press roll 82 between upper and lower press rolls 82 and the press 90, reciprocates from side to side along the bracket 58. The suction pad 64 is attached to the top of the moving cylinder 62 for holding the positive electrode plate 7 that has been pressed from the press roll 82 and thus transferring to the left edge of the cut-off press 90.

The moving cylinder 86 as shown in FIGS. 13A to 13C is attached to a base portion 84 being parallel to the under-shuttle 33 between the bracket 58 and the press 90. The moving cylinder 86 can be reciprocated from side to side 84 by a guide rod 99 situated along the base portion 84. The suction pad 64 that is formed as a unit with the moving cylinder 86 by a pad bracket 100 connected to the top of the moving cylinder 86 reciprocates from side to side according to the reciprocation of the pad bracket 100 along a guide rail 107 by the moving cylinder 86 so that the suction pad 64 holds and then transfers the positive electrode plate 7 that is transferred to the press 90 by the suction pad 64.

According to the above assembling machine for the positive electrode plate 1 as shown in FIG. 2, the positive electrode plate is assembled through a series of processes as follows.

The cut positive electrode plate that has been coated automatically at the coating machine stacks manually in the magazine 5 of the electrode plate feeding unit 3 as shown in FIG. 5, and the Ni foil roll is attached to a tab feeding unit 19.

The positive electrode plates 7 are moved one by one from the magazine 5 of the electrode plate feeding unit 3 by the suction pad 35 and transferred to the under-shuttle 33 so they are transferred to the active material removing unit 13 (Si).

The positive electrode plate 7 transferred to the active material removing unit 13 as shown in FIG. 6 is moved to an active material removing position by the finger portion 45. The cleaner horn 51 of the ultrasonic cleaner 11 that is positioned at the active material removal area 9 removes the active material coating thereon by ultrasonic vibration. The active material powder is removed by the vacuum cleaner (S2).

At the tab feeding unit 19 as shown in FIG. 7, two Ni foil coated tab strips 17 from upper and lower tab strip rolls 15 are provided by the sliding air feeder 37 through the cutting unit 23 to the tact welding unit 25.

The tab strips 17 transferred to the tact welding unit 25 are temporarily welded at one point by upper and lower welding tips 73 and 75 of the tact welding unit 25 as shown in FIG. 8 while the edge of the tab strip 17 is folded respectively on upper and lower faces of the active material removal area 9 of the positive electrode plate 7 that is loaded at the temporarily welded area by the under-shuffle 33 (S4).

After the tack welding, a rectangular tab 21 is made by cutting the edge portion of upper and lower tab strips 17, that are Contemporarily welded on upper and lower faces of the active material removal area 9 of the positive electrode plate 7, by upper and lower cutting blades 67 and 71 of the cutting unit 23 (S5).

The positive electrode plate 7 whereon the tab 21 is welded is transferred again to the finish welding unit 27 by the under-shuttle 33 as shown in FIG. 10. When the positive electrode plate 7 is transferred to the finish welding unit 27, the orthogonal robot 89 is moved along a rail 94 toward the under-shuttle 33, where it holds the positive electrode plate 7 that is positioned at the under-shuttle 33 by the finger portion. 88. The orthogonal robot 89 also loads the positive electrode plate 7 at the finish welding area after returning to the finish welding area. After loading the positive electrode plate 7, the finish welding is carried out by upper and lower tips 83 and 85 of the welding machine 87, and wherein the precisely moving orthogonal robot 89 multi-welds three or four time (S6).

After the finish welding is completed, the positive electrode plate 7 is calendered by the calender rolling unit 28 as shown in FIGS. 11 and 12. When the positive electrode plate 7 is transferred by the under-shuttle 33 as shown in FIG. 11, the moving cylinder 52 of the moving portion 60 moves to the edge of the bracket 56, and then pushes the positive electrode plate 7 between upper and lower press rolls 82 by the push rod 50 that protrudes from the push cylinder 53. When the press roll 82 that is rotated by the rotational force from the driving motor 70 through the sprocket 72, the main spindle 74, and the idling spindle 76 calenders the loaded positive electrode plate 7, the positive electrode plate 7 becomes thinner and longer (S7).

After rolling, the positive electrode plate 7 is held by the suction pad 64 of the blanking press unit 31 as shown in FIG. 13, and is then transferred to the right side of the bracket 58 by the cylinder 62. After the transferred positive electrode plate 7 is held again by the suction pad 103, the positive electrode plate 7 is transferred to blanking position of the press 90 as shown in FIG. 14. After the positive electrode plate 7 is put into the blanking position, the positive electrode plate 7 is finally cut in a desired shape 29 by a mold base 96 that has a desired shape of opening and a blanking punch 97 having the same shape as the opening of the mold base 96 (S8).

According to the assembling machine for the positive electrode plate and assembly process thereof, the positive electrode plate for Ni-MH batteries can be continuously made through an automated on-line production process so that working steps and production time for the manufacture thereof can be substantially reduced. This results in the reduction of cost and reject rate for the production of positive electrode plates.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An assembling machine for a positive electrode plate for Ni-MH batteries comprising:

an electrode plate feeding unit having a magazine that manually loads and stacks a cut positive electrode plate;

an active material removing unit having an ultrasonic cleaner that removes an active material from an active material removal area of the positive electrode plate;

a tab feeding unit transferring a tab strip from a tab strip roll;

a tack welding unit that temporarily welds an edge of the transferred tab strip to upper and lower faces of the active material removal area of the positive electrode plate;

a cutting unit that cuts a rectangular tab of a predetermined size from the temporarily welded tab strip;

a finish welding unit that fully welds the temporarily welded tab, a calender rolling unit that presses the positive electrode plate to a predetermined thickness; and a blanking press unit that cuts the calendar rolled positive electrode plate into a desired shape.

2. An assembling machine for a positive electrode plate for Ni-MH batteries according to claim 1, further comprising an under-shuttle disposed on a bottom surface of the assembling machine, the under-shuttle transferring the positive electrode plate between each of the units.

3. An assembling machine for a positive electrode plate for Ni-MH batteries according to claim 2, wherein the under-shuttle comprises a base plate enclosing a base, a slide plate moving between each unit, a fixed seat attached above the slide plate for locating the positive electrode plate, a moving seat that moves toward two opposite ends of the slide plate through an opening at a center portion of the fixed seat, and a guide cylinder causing a reciprocation of the moving seat.

4. An assembling machine for a positive electrode plate for Ni-MH batteries according to claim 1, wherein the magazine reciprocates along a guide rod and wherein the electrode plate feeding unit comprises a suction pad holding the positive electrode plate on the magazine and transferring the positive electrode plate to the under-shuttle, and a cylinder reciprocating a pad bracket with the suction pad that is at a right angle to the under-shuttle.

5. An assembling machine for a positive electrode plate for Ni-MH batteries according to claim 1, wherein the active material removing unit comprises a finger portion for holding the positive electrode plate, a cylinder connected to the finger portion through an upper hand portion for sliding the finger portion in an axial direction, and wherein the ultrasonic cleaner removes by a cleaning horn the active material from the active material removal area of the electrode plate.

6. An assembling machine for a positive electrode plate for Ni-MH batteries according to claim 1, wherein the tab feeding unit comprises two tab strip rolls disposed for rotation at upper and lower shafts that are attached at two opposite ends of a column, and a sliding air feeder sliding with the tab strips for unwinding the tab strips from the tab strip rolls.

7. An assembling machine for a positive electrode plate for Ni-MH batteries according to claim 1, wherein the cutting unit comprises an upper cutting blade disposed on a lower plate reciprocating along a guide post, and a cylinder that is disposed at the upper plate reciprocating the lower plate.

8. An assembling machine for a positive electrode plate for Ni-MH batteries according to claim 2, wherein the tack welding unit comprises a welding machine having upper and lower tips that are disposed at upper and lower active material removal areas of the positive electrode plate that is loaded in a tack welding position, a finger portion holding and loading the positive electrode plate to the tack welding position, and a sliding cylinder disposed at a right angle with the under-shuttle for reciprocating the finger portion in an axial direction.

9. An assembling machine for a positive electrode plate for Ni-MH batteries according to claim 2, wherein the finish welding unit comprises a welding machine having upper and lower tips disposed at upper and lower tab overlapped areas of the positive electrode plate that is loaded at a finish welding position, a finger portion holding and loading the positive electrode plate at the finish welding position, and an orthogonal robot disposed at a right angle with the under-shuttle for reciprocating the finger portion in an axial direction.

10. An assembling machine for a positive electrode plate for Ni-MH batteries according to claim 2, wherein the calendar rolling unit comprises a pressing portion having a driving motor generating a rotational driving force, a rotating main spindle, coupled to the driving motor through a sprocket, an idling spindle coupled to the main spindle by upper and lower driven gears, and upper and lower press rolls coupled to the main spindle and the idling spindle by a universal joint pressing the positive electrode plate that is transferred by the under-shuttle, and a moving portion having a lateral reciprocating moving cylinder attached at a bottom of the bracket in a direction normal to upper and lower press rolls and a push cylinder transferring the positive electrode plate between upper and lower press rolls by a vertical reciprocating push rod attached at a bottom of the moving cylinder.

11. An assembling machine for a positive electrode plate for Ni-MH batteries according to claim 10, wherein the blanking press unit comprises a press for cutting to a predetermined shape the positive electrode plate, a lateral reciprocating moving cylinder that is attached to a top of the bracket disposed in a normal direction to upper and lower press rolls, a suction pad that is attached to a top of the moving cylinder for holding the pressed positive electrode plate, a lateral reciprocating moving cylinder along a guide rod above a base portion being parallel to the top of the bracket, and a suction pad that transfers the positive electrode plate moved to the press by the suction pad that is attached to a bottom of a pad bracket on the top of the moving cylinder.

* * * * *